United States Patent [19]

Kim

[11] Patent Number: 5,637,967

[45] Date of Patent: Jun. 10, 1997

[54] REGENERATION CONTROL DEVICE USING BRAKE INERTIA IN INDUSTRIAL ELECTRIC VEHICLES AND METHOD THEREFOR

[75] Inventor: Jong-Gun Kim, Changwon-Shi, Rep. of Korea

[73] Assignee: Samsung Heavy Industry Co., Ltd., Rep. of Korea

[21] Appl. No.: 334,684

[22] Filed: Nov. 4, 1994

[30] Foreign Application Priority Data

Dec. 30, 1993 [KR] Rep. of Korea .................. 1993-31452

[51] Int. Cl.⁶ .................................................. H02P 3/14
[52] U.S. Cl. ................................... 318/376; 318/139
[58] Field of Search .................................. 318/375, 376, 318/293, 300, 139

[56] References Cited

U.S. PATENT DOCUMENTS

| | | | |
|---|---|---|---|
| 4,388,573 | 6/1983 | Horiuchi et al. | 318/376 |
| 4,423,363 | 12/1983 | Clark et al. | 318/375 |
| 4,427,928 | 1/1984 | Kuriyama et al. | 318/139 |
| 4,479,080 | 10/1984 | Lambert | 318/373 |
| 5,123,598 | 6/1992 | Albanesius et al. | 318/285 |

*Primary Examiner*—Brian Sircus
*Attorney, Agent, or Firm*—Lieberman & Nowak, LLP

[57] ABSTRACT

Disclosed is a regeneration device used for industrial electric vehicle including a main controller having a microcomputer, a contactor circuit having forward and reverse current paths comprised of a DC choke coil, a battery, and an acceleration switch connected to the batter. The device includes, forward and reverse switches having first passive terminals connected in common to an "ON" terminal of the acceleration switch, second passive terminals connected in common to an "OFF" terminal of the acceleration switch through a brake relay, and driving terminals respectively connected to first and second magnetization coils; a forward/reverse driving transistor connected between the first and second magnetization coils and a ground terminal, the forward/reverse driving transistor being controlled by the main controller; a regeneration driving transistor connected between a third magnetization coil connected to the "ON" terminal of the acceleration switch and the ground terminal, the regeneration driving transistor being controlled by the main controller; a first field effect transistor (FET) connected between the battery and a terminal of the contactor circuit, the first FET being controlled by the main controller; a regeneration contactor connected to another terminal of the contactor circuit through a DC motor; and a second FET connected to another terminal of the contactor circuit through a resistor, the second FET being controlled by the main controller.

7 Claims, 2 Drawing Sheets

REGENERATION CONTROL DEVICE USING BRAKE INERTIA IN INDUSTRIAL ELECTRIC VEHICLES AND METHOD THEREFOR

BACKGROUND OF THE INVENTION

The present invention relates generally to industrial electric vehicles and more particularly, to a regeneration device and method for batteries by using brake inertia.

When industrial electric vehicles, such as battery forklifts, using batteries as the power source operate the brake while traveling, inertia force is generated from the brake. Conventionally, however, there were no industrial electric vehicles employing a control device for converting the inertia force into electrical energy. Thus, the conventional brake system is disadvantageous in saving the batteries and in addition, it is not efficient for employment in industrial electric vehicles. Further, since such industrial electric vehicles have only mechanical braking functions and do not have electric braking functions, the vehicle driver may suffer uncomfortable shocks due to the mechanical braking operations while working.

SUMMARY OF THE INVENTION

Accordingly, it is an object of the present invention to provide a regeneration device and method for converting the inertia energy generated while braking into electrical energy.

According to one object of the present invention, a regeneration control device used in industrial electric vehicles including a main controller having a microcomputer, a contactor circuit having forward and reverse current paths comprised of a DC choke coil, a battery, and an acceleration switch connected to the battery including, forward and reverse switches having first passive terminals connected in common to an "ON" terminal of the acceleration switch, second passive terminals connected in common to an "OFF" terminal of the acceleration switch through a brake relay, and driving terminals respectively connected to first and second magnetization coils; a forward/reverse driving transistor connected between the first and the second magnetization coils and a ground terminal, the forward/reverse driving transistor being controlled by the main controller; a regeneration driving transistor connected between a third magnetization coil connected to the "ON" terminal of the acceleration switch and the ground terminal, the regeneration driving transistor being controlled by the main controller; a first field effect transistor (FET) connected between the battery and a terminal of the contactor circuit, the first FET being controlled by the main controller; a regeneration contactor connected to another terminal of the contactor circuit through a DC motor; and a second FET connected to the another terminal of the contactor circuit through a resistor, the second FET being controlled by the main controller.

According to another aspect of the present invention, a regeneration control method used in industrial electric vehicles including a main controller having a microcomputer, a contactor circuit having forward and reverse current paths comprised of a DC choke coil, a battery, and an acceleration switch connected to the battery includes the steps for detecting whether the acceleration switch is in an "OFF" state; setting any one of the forward path and the reverse path according to the condition of a forward switch and a reverse switch if a brake switch is in an "ON" state and a neutral switch is in an "OFF" state; supplying magnetization current to the DC choke coil for a predetermined time interval, so as to set an electric generation braking mode; and providing the battery with the current generated in the electric generation braking mode.

BRIEF DESCRIPTION OF THE DRAWINGS

These and other objects, features, and advantages of the present invention are better understood by reading the following detailed description of the invention, taken in conjunction with the accompanying drawings. In the drawings, it should be noted that like elements represent like symbols or reference numerals, wherein.

DETAILED DESCRIPTION OF THE PREFERRED EMBODIMENT

It should be noted that a term "regeneration" used throughout the specification means an operation where inertia energy generated by braking is converted into electrical energy. Namely, In FIG. 1, an operation for recharging the battery with the electromotive force, which is generated from a DC shunt motor A when braking the vehicle during a power running mode for transmitting the power to load, 1s called "regeneration".

Figure 1:
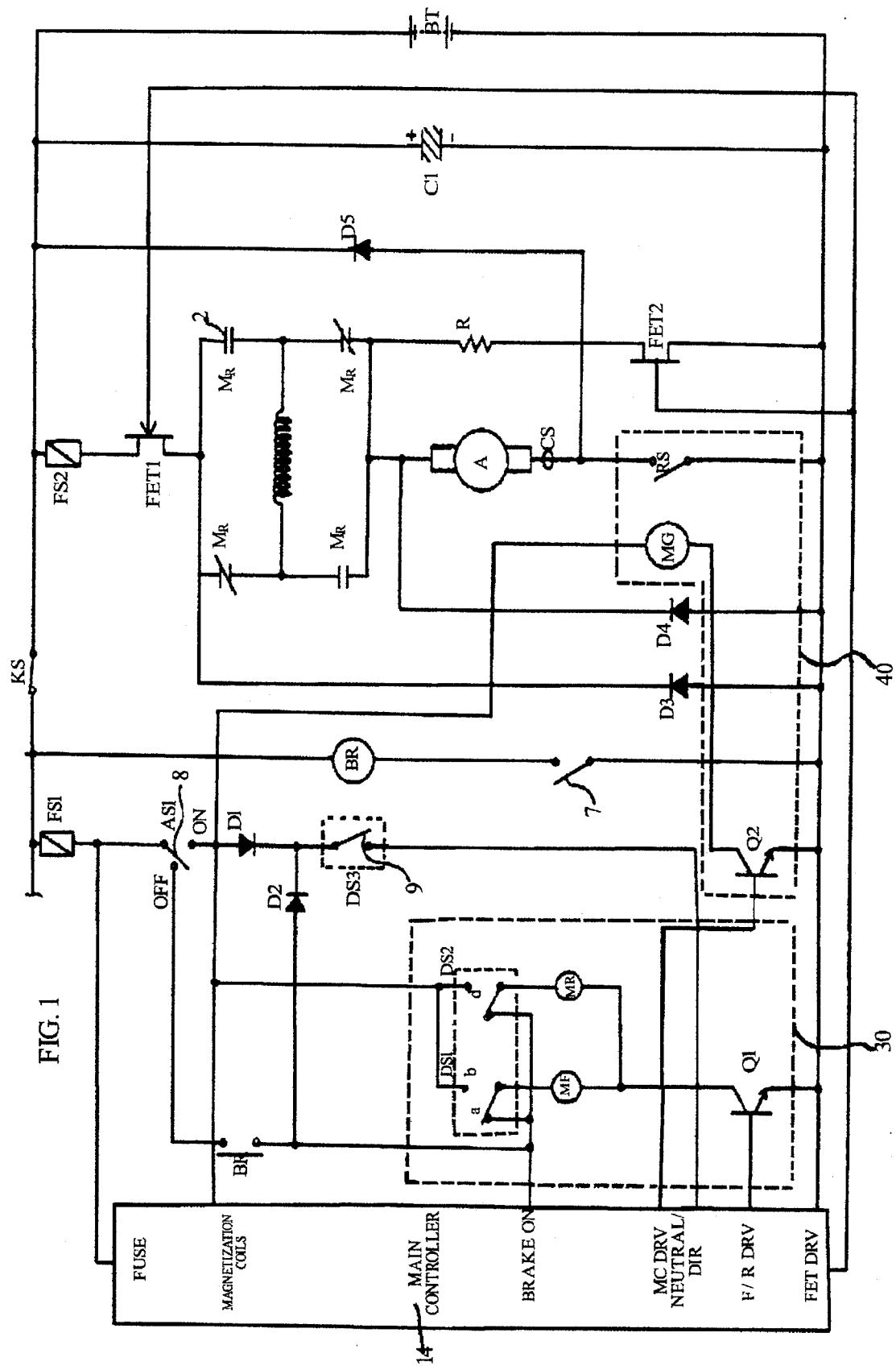
FIG. 1 is a circuit diagram of a regeneration control device according to the present invention.

Referring to FIG. 1, a regeneration control device according to the present invention includes a forward/reverse switching circuit 30, a regeneration switching circuit 40, and a main controller 14 comprised of a microcomputer.

The forward/reverse switching circuit 30 includes a forward switch DS1, a reverse switch DS2, a forward magnetization coil MF connected to the forward switch DS1, a reverse magnetization coil MR connected to the reverse switch DS2, and a forward/reverse driving transistor Q1 having a collector connected in common to the forward magnetization coil MF and the reverse magnetization coil MR.

Two passive terminals of the forward switch DS1 and the reverse switch DS2 are connected in common to the main controller 14. The transistor Q1 has a base electrode connected to a forward/reverse driving terminal and an emitter electrode connected to the ground. Two more passive terminals of the forward switch DS1 and the reverse switch DS2 are connected in common to a passive "ON" terminal of an acceleration switch AS1. The "ON" terminal of the acceleration switch AS1 is also connected to a neutral sensing terminal of the main controller 14 by way of a diode D1 and a neutral switch DS3. A diode D2 is connected between a brake sensing terminal of the main controller 14 and a node formed between the diode D1 and the neutral switch DS3. Mother passive terminal, an "OFF" terminal, of the acceleration switch AS1 is connected to the brake sensing terminal of the main controller 14 by way of a brake relay BR. A driving terminal of the acceleration switch AS1 is connected to a positive terminal of the battery by way of a fuse FS1 and is also connected to a fuse terminal of the main controller 14.

The regeneration switching circuit 40 includes a regeneration driving transistor Q2 having a base electrode connected with a magnetization coil driving terminal of the main controller 14 and an emitter electrode connected with the ground, a regeneration magnetization coil MG connected between a magnetization coil terminal of the main controller 14 and a collector electrode of the transistor Q2, and a regeneration contactor (or regeneration switch) RS having a driving terminal connected to the emitter electrode of the transistor Q2. A passive terminal of the regeneration contactor RS is connected with the positive terminal of the battery BT by way of the regeneration diode D5. The passive terminal of the regeneration contactor RS is also connected with one terminal of the DC shunt motor A. Another electrode of the DC shunt motor A is connected to a cathode electrode of a plugging diode D4 of which anode electrode is connected to the ground. Two forward switching magnetic contactors Mf, two reverse switching magnetic contactors Mr and a DC choke coil F are connected between the DC shunt motor A and a chopping transistor FET1 having a gate electrode connected to a driving terminal of the main controller 14 and a channel connected to the positive terminal of the battery BT by way of a fuse FS2. In more detail, one forward switching magnetic contactor Mf and one reverse switching magnetic contactor Mr are connected in parallel to the chopping transistor FET1 and, in similar, another forward switching magnetic contactor Mf and another reverse switching magnetic contactor Mr are connected in parallel to the DC shunt motor A. Two forward switching magnetic contactors Mf and two reverse switching magnetic contactors Mr are respectively arranged to cross with each other. The DC shunt motor A is connected to a node formed at a junction of the forward switching magnetic contactor Mf and the reverse switching contactor Mr. The chopping transistor FET1 has a channel connected to a cathode electrode of a flywheel diode D3 of which an anode electrode is connected to the ground.

Figure 2:
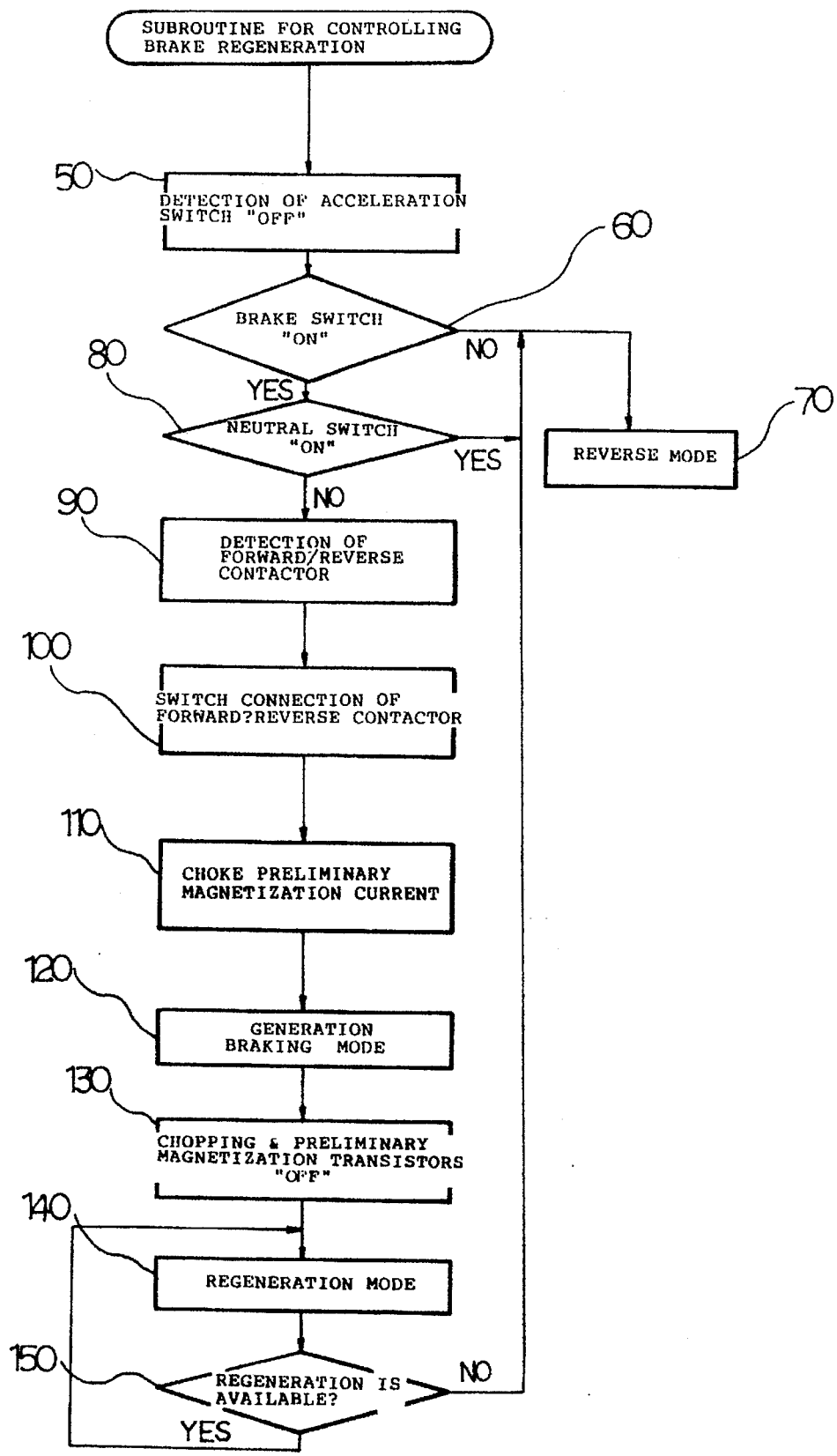
FIG. 2 is a flow chart for showing a regeneration control method according to the present invention.

Now, with reference to FIG. 2, operation of a regeneration control device according to the present invention of FIG. 1 will be explained in detail hereinbelow. It should be first noted that the present invention is directed to recharging the batteries by converting the inertia energy generated by braking into electrical energy, in which the inertia energy is generated by braking while the vehicle travels in the power running mode.

Firstly, while the vehicle travels forwardly, the acceleration switch AS1 is switched to an "ON" terminal and the main controller 14 is provided with the voltage of 48 V from the battery BT through the diode D1 and the neutral switch DS3, thereby sensing that the vehicle is travelling forward. At this moment, since the driving terminal of the forward switch DS1 is switched to a passive terminal "b", the main controller 14 magnetizes the forward magnetization coil MF and turns on the transistor Q1, so that the forward switching magnetic contactors Mf are switched for the forward traveling. A chopping time of the chopping transistor FET1 is variably controlled to provide the DC shunt motor A with the operating current, so that the electric vehicle maintains the present forward traveling status. Meanwhile, the regeneration driving transistor Q2 is turned on to drive the regeneration magnetization coil MG, and the regeneration contactor RS is maintained in the closed status.

In the meantime, if the vehicle driver releases an acceleration pedal and presses a brake pedal during a forward traveling, the driving terminal of the acceleration switch AS1 is switched to the "OFF" terminal thereof. The driving terminal of the forward switch DS1 is disconnected from the passive terminal "b" thereof, so that the current flowing through the forward magnetization coil MF is blocked. Further, the relay coil BL is driven by the brake switch BS and the brake relay BR is driven by means of the fuse FS1 and the acceleration switch AS1. Consequently, the main controller 14 detects, through the brake sensing terminal thereof, that the brake is in an "ON" state, and thereafter judges, through the diode D2, that the vehicle is in the power running state by the neutral switch DS3. Then, the current path including the DC choke coil F is changed according to the switching state of the reverse switch DS2, thus resulting in switching the polarity of the DC choke coil F. At this moment, the chopping transistor FET1 and the preliminary magnetization transistor FET2 are turned on simultaneously for a predetermined time interval, and the current generated by the DC motor A is flown through a closed loop of the current sensor CS—the regeneration diode D5—the fuse FS2—the chopping transistor FET1—the one reverse switching magnetic contactor Mr—the DC choke coil F—the another reverse switching magnetic contactor Mr, so that the brake mode is set for generating the braking torque.

If the chopping transistor FET1 and the preliminary magnetization transistor FET2 are turned off after a while, a regeneration mode for charging the battery BT through a path of the flywheel diode D3—the one reverse switching magnetic contactor Mr—the DC choke coil F the other reverse switching magnetic contactor Mr—the DC motor A the current sensor CS—the regeneration diode D5 is set, so as to convert the energy which is stored in the inductance through the closed loop during brake mode into a battery power source. Here, the plugging diode D4 allows the current to flow to the DC motor A only when the traveling is reversed to the power running mode.

Next, referring to FIG. 2, the control method according to the present invention will be explained, in detail.

In step 50, it is detected that the acceleration switch AS1 is in the "OFF" state, so as to check whether the vehicle travels in a forward travelling state or in a power running state.

In step 60, it is judged whether the brake switch BS is in the "ON" state, because the acceleration switch AS1 is in the "OFF" state. Then, in step 70, if the brake switch BS is not in the "ON" state, a present power running mode is continuously executed.

To the contrary, however, if the brake switch BS is in the "ON" state, it is judged in step 80 whether the neutral switch DS3 is in the "ON" state. If the neutral switch DS3 is in the "ON" state, the main controller 14 determines that the vehicle is in the power running mode and thus, executes step 70 to perform the power running mode.

If the neutral switch DS3 is not in the "ON" state, the main controller 14 detects in step 90 whether the forward switch DS1 or the reverse switch DS2 is operated.

In step 100, the main controller 14 magnetizes the forward magnetization coil MF or the reverse magnetization coil MR according to the switching states of the forward switch DS1 and the reverse switch DS2, so as to switch the forward switching magnetic contactor Mf or the reverse switching magnetic contactor Mr for changing the polarity of the choke coil F.

In step 110, the chopper time of the chopping transistor FET1 is variably controlled in response to the control signal supplied from the main controller 14, so that the choke preliminary magnetization current flowing through the choke coil F connected between the forward switching magnetic contactor Mf and the reverse switching magnetic contactor Mr is controlled to be appropriate for the vehicle speed.

In step 120, since the current generated from the DC motor A is flown along the closed loop of the current sensor CS—the regeneration diode D5—the fuse F2—the chopping transistor FET1—one reverse switching magnetic contactor Mr—the DC choke coil F—another reverse switching magnetic contactor Mr—the DC motor A, an electric generation braking mode for generating the braking torque is set.

In step 130, after lapse of a predetermined time by the chopping transistor FET1, the chopping transistor FET1 and the preliminary magnetization transistor FET2 are turned off simultaneously.

In step 140, the regeneration mode for recharging the braking current to the both electrodes of the battery BT by way of the path of the flywheel diode D3—the one reverse switching magnetic contactor Mr—the DC choke coil F—the other reverse switching magnetic contactor Mr—the DC motor A—the current sensor CS—the regeneration diode D5 is set.

In step 150, it is judged whether the current increment of the plugging diode D4 supplied from the current sensor CS is greater than a predetermined value, to determine whether regeneration is available. If it is determined that regeneration is available, the processing routine returns to step 140 to perform the regeneration mode. If it is determined that regeneration is not available, the processing routine returns to step 70 for performing the power running mode.

As described above, the present invention regenerates the electric current from braking operation during traveling by using the regenerative brake control device and recharges the regenerated current to the battery, so that the expected life span of the battery and the braking efficiency of the brake system may be improved drastically.

What is claimed is:

1. A regeneration control device for use in industrial electric vehicles utilizing a main controller with a microcomputer, a battery, an acceleration switch connected to the battery, a DC motor, a contactor circuit with both forward and reverse current paths and a DC choke coil, the regeneration control device comprising:

forward and reverse switches having first passive terminals connected in common to an ON terminal of said acceleration switch, second passive terminals connected in common to an OFF terminal of said acceleration switch through a brake relay, and driving terminals respectively connected to first and second magnetization coils;

a forward/reverse driving transistor connected between said first and second magnetization coils and a ground terminal, said forward/reverse driving transistor being controlled by said main controller;

a third magnetization coil connected to the ON terminal of said acceleration switch a regeneration driving transistor connected between the third magnetization coil and the ground terminal, said regeneration driving transistor being controlled by said main controller;

a first field effect transistor (FET) connected between said battery and a first terminal of said contactor circuit, said first FET being controlled by said main controller; a regeneration contactor connected to a second terminal of said contactor circuit through the DC motor; and a second FET connected to the second terminal of said contactor circuit through a resistor, said second FET being controlled by said main controller.

2. A regeneration control device as claimed in claim 1, wherein said second passive terminals of said forward and reverse switches are connected to a brake sensing terminal of said main controller together with said brake relay, said regeneration contactor is connected between said DC motor and the ground terminal, and said first and second FETs have gate electrodes connected in common to a control terminal of said main controller.

3. A regeneration control device as claimed in claim 2, wherein said contactor circuit comprises:

a first forward contactor and a first reverse contactor having first electrodes connected in common to said first FET and second electrodes connected respectively to both electrodes of said DC choke coil; and a second forward contactor and a second reverse contactor having first electrodes connected respectively to both electrodes of said DC choke coil and second electrodes connected in common to said DC motor.

4. A regeneration control device as claimed in claims 2 or 3, further comprising:

a first diode having an anode electrode connected to the "ON" terminal of said acceleration switch;

a neutral switch connected between a cathode electrode of said first diode and said main controller;

a second diode having an anode electrode connected the second passive terminals of said forward and reverse switches and a cathode electrode connected to the cathode electrode of said first diode;

a brake switch connected to both electrodes of said battery;

a third diode having a cathode electrode connected to a terminal of said contactor circuit and an anode electrode connected to the ground terminal;

a fourth diode having a cathode electrode connected to another electrode of said contactor circuit and an anode electrode connected to the ground terminal;

a fifth diode having an anode electrode connected to a node formed between said DC motor and said regeneration contactor and a cathode electrode connected to a positive terminal of said battery; and a capacitor connected to both electrodes of said battery.

5. A regeneration control method for use in industrial electric vehicles utilizing a main controller with a microcomputer, a battery, an acceleration switch connected to the battery and operable in ON and OFF states, forward and reverse switches each having first terminals connected in common to an ON terminal of the acceleration switch, and forward and reverse switches having second terminals connected in common to an OFF terminal of said acceleration switch through a brake relay, a contactor circuit having forward and reverse contactors for conducting current through a forward current path and a reverse current path, respectively, a DC motor connected to a node formed at a junction of the forward current path and reverse current path, and a DC choke coil connected to said contactor circuit for providing regenerating current to said battery, the regeneration control method comprising the steps of:

detecting when said acceleration switch is switched to an OFF state;

determining a condition of a brake switch and a neutral switch for said vehicle, and conducting current through one of the forward current path and the reverse current path according to a condition of said forward switch and said reverse switch if said brake switch is in an ON state and said neutral switch is in an OFF state;

providing an electric braking mode for the vehicle by supplying magnetization current from said DC motor to said DC choke coil for a predetermined time interval; and providing current to said battery from energy stored in said DC choke coil during said electric generation braking mode.

6. A regeneration control method as claimed in claim 5, wherein a power running mode is performed if said brake switch is in an OFF state and said neutral switch is in an ON state.

7. A regeneration control method as claimed in claim 5, wherein a power running mode is performed if said generated current is below a predetermined value.

* * * * *